US009660768B2

(12) United States Patent
Sapio et al.

(10) Patent No.: US 9,660,768 B2
(45) Date of Patent: May 23, 2017

(54) DENSE ACKNOWLEDGEMENT BROADCAST/MULTICAST

(71) Applicant: Link Labs, LLC, Annapolis, MD (US)

(72) Inventors: Adrian Sapio, Mount Airy, MD (US); Jeffrey Andrew Koul, Severna Park, MD (US); Allen Welke, Columbia, MD (US); Brian Emery Ray, Annapolis, MD (US)

(73) Assignee: LINK LABS, INC., Annapolis, MD (US)

( * ) Notice: Subject to any disclaimer, the term of this patent is extended or adjusted under 35 U.S.C. 154(b) by 115 days.

(21) Appl. No.: 14/604,927

(22) Filed: Jan. 26, 2015

(65) Prior Publication Data

US 2016/0218833 A1 Jul. 28, 2016

(51) Int. Cl.
*H04L 1/16* (2006.01)
*H04L 1/00* (2006.01)

(52) U.S. Cl.
CPC .... *H04L 1/1628* (2013.01); *H04L 2001/0093* (2013.01)

(58) Field of Classification Search
USPC .................. 370/329, 330, 342, 312
See application file for complete search history.

(56) References Cited

U.S. PATENT DOCUMENTS 7,127,655 B2   10/2006   Chandhok et al.
7,876,675 B2   1/2011    Ueno (Continued)

FOREIGN PATENT DOCUMENTS

WO    WO/2008/101861    8/2008
WO    WO 2014/043761    3/2014

OTHER PUBLICATIONS

"11 n Bock Acknowledgement," Sumantha Kavuri, "Wi-Fi notebook: 11 n Block Ack.," URL=http://80211notes.blogspot.com/2014/04/11n-block-acknowledgement.html, Apr. 18, 2014, 4 pgs.

(Continued)

*Primary Examiner* — Edan Orgad
*Assistant Examiner* — Emmanuel Maglo
(74) *Attorney, Agent, or Firm* — Potomac Law Group; Charles B. Lobsenz; Brian H. Buck

(57) ABSTRACT

A method (of operating a central node to acknowledge received messages) includes: receiving multiple data messages from multiple instances of a message-sourceable end node, respectively, each end-node-instance having an at least substantially unique identification ("ID"); and sending a dense acknowledgement message ("dense ACK") acknowledging receipt of the data messages but not explicitly identifying any of the IDs of the corresponding end-node-instances. And a method (of operating a given instance of the end node to infer a delivery-condition at the central node of a data message sent by the given instance) including: sending a given data message including the substantially unique ID; receiving a dense ACK including a payload indicating receipt of multiple data messages but not explicitly identifying IDs of the given end-node-instance nor of other end-node-instances corresponding to the received messages, respectively; and inferring the delivery-condition based on a manipulated payload of the dense ACK.

26 Claims, 8 Drawing Sheets

(56) References Cited

U.S. PATENT DOCUMENTS

| | | | |
|---|---|---|---|
| 7,903,632 | B2 | 3/2011 | Nishibayashi et al. |
| 8,149,769 | B2 | 4/2012 | Lee et al. |
| 8,184,629 | B2 | 5/2012 | Eberle et al. |
| 8,208,379 | B2 | 6/2012 | David |
| 8,327,060 | B2 | 12/2012 | Heim |
| 8,406,165 | B2 | 3/2013 | Won et al. |
| 8,675,538 | B2 | 3/2014 | Potkonjak |
| 8,732,453 | B2 | 5/2014 | Mraz et al. |
| 2002/0119821 | A1 | 8/2002 | Sen et al. |
| 2006/0114848 | A1 | 6/2006 | Eberle et al. |
| 2008/0070547 | A1 | 3/2008 | Schreyer |
| 2008/0259891 | A1* | 10/2008 | Dent ............ H04L 5/0053 370/342 |
| 2010/0046540 | A1 | 2/2010 | Nishibayashi et al. |
| 2011/0066297 | A1* | 3/2011 | Saberi ............ F16K 31/046 700/287 |
| 2011/0214175 | A1 | 9/2011 | Haddad |
| 2011/0286402 | A1* | 11/2011 | Gong ............ H04L 1/1685 370/329 |
| 2013/0051401 | A1 | 2/2013 | Eller et al. |
| 2013/0136033 | A1* | 5/2013 | Patil ............ H04W 84/18 370/255 |
| 2013/0282890 | A1* | 10/2013 | Ma ............ H04L 43/12 709/224 |
| 2014/0092752 | A1* | 4/2014 | Hui ............ H04L 67/32 370/242 |
| 2014/0328313 | A1* | 11/2014 | Merlin ............ H04B 7/2621 370/330 |
| 2016/0183243 | A1* | 6/2016 | Park ............ H04W 72/0413 370/329 |

OTHER PUBLICATIONS

"Implementation of IEEE 802.11e Block Acknowledgement Policies," Orlando Cabral et al., Proceedings of the World Congress on Engineering 2008, vol. I, Jul. 2-4, 2008, 6 pgs.

"LoWPAN fragment . . . draft-thubert-6lowpan-simple-fragment-recovery-07," P. Thubert (Ed.), URL=http://tools.ietf.org/html/draftthubert6lowpansimplefrag, Jun. 4, 2010, 32 pgs.

"Performance analysis of greedy fast-shift block acknowledgement . . . " (Abstract), Wen-Jiunn Liu et al., "Journal Wireless Networks," vol. 20, Issue 8, Nov. 2014, pp. 2503-2519.

"A Lightweigh1 Protocol for Wireless Sensor Networks," Agrawal, Prashant, Teck,Tan Sun, and Ananda, A.L., Wireless Communications and Networking, 2003. WCNC 2003. 2003 IEEE (vol. 2), Mar. 20-23, 2003, pp. 1280-1285. URL=http://eps2009.dj-inod.com/docs/09-02-01/a_lightweight_protocol_for_wireless_sensor_networks.pdf.

"A Probabilistic Acknowledgment Mechanism for Wireless Sensor Networks," Miloš Blagojević et al., NAS 2011, IEEE International Conference on Networking, Architecture, and Storage, Jul. 29-30, 2011, pp. 63-72, URL=http://citeseerx.ist.psu.edu/viewdoc/download?doi=10.1.228.9149&rep=rep1&1type=pdf.

"Block Acknowledgement: Redesigning the Window Protocol," Brown, G.M. et al., "Proceeding SIGCOMM '89 Symposium proceedings on Communications architectures & protocols," vol. 19, Issue 4, Sep. 1989, pp. 128-135, URL=http://www.cs.utexas.edu/~gouda/papers/journal/ja33.pdf.

"Cost Effective Acknowledgement Mechanism for Underwater Acoustic Sensor Network," Shin, S.Y. et al., "International Journal of Multimedia and Ubiquitous Engineering," vol. 7, No. 2, Apr. 2012, pp. 463-468, URL=http://citeseerx.ist.psu.edu/viewdoc/download?doi=10.1.1.233.386&rep=rep1&type=pdf.

"RWA: Reduced Whole Acknowledgement mechanism for Underwater Acoustic Sensor Network," Shin, Y.S., et al., 2012 International Conf. on Information Science and Technology, Apr. 28-30, 2012, URL= http://onlinepresent.org/proceedings/vol3_2012/65/pdf.

* cited by examiner

DENSE ACKNOWLEDGEMENT BROADCAST/MULTICAST

FIELD OF THE DISCLOSURE

Embodiments of the present invention relate to methods of broadcasting/multicasting an acknowledgement, and more particularly broadcasting/multicasting a dense acknowledgement.

BACKGROUND

Most wireless data networks must deal with the problem of an imperfect transmission channel, and thus must employ some form data integrity validation at the receiver, typically an error detection algorithm such as a checksum or Cyclic Redundancy Check ("CRC") on data packets. When such algorithms detect a transmission error regarding data that must be transmitted error-free, the system must employ a form of Automatic Repeat Request ("ARQ") functionality, which includes communicating a re-transmission request from the receiver of the corrupted data to the original sender. ARQ functionality typically includes sending an acknowledgement ("ACK") or a negative acknowledgment ("NACK") message with an address field that uniquely identifies a specific node or set of nodes to which the ACK or NACK is associated.

Data networks that employ star topologies, such as systems with base stations, access points or gateways, typically must deal with transmission resource constraints at the central node due to the one-to-many relationship between the central node and end nodes that is inherent in the star topology. In wireless networks, these constraints typically manifest in time, spectrum or power resources.

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," *RFID Journal*, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

It was assumed that Moore's law would advance computing and communication capabilities so rapidly that soon any embedded device could implement IP protocols. Alas, this has not proven true for cheap, low-power microcontrollers and low-power wireless radio technologies. The vast majority of simple embedded devices still make use of 8-bit and 16-bit microcontrollers with very limited memory because they are low-power, small and cheap. Also, the physical trade-offs of wireless technology have resulted in short-range, low-power wireless radios which have limited data rates, frame sizes and duty cycles, e.g., as in the IEEE 802.15.4 standard.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of acknowledging received messages, the method comprising: receiving, at a central node, multiple data messages from multiple instances of a message-sourceable end node, respectively, each end-node-instance having an at least substantially unique identification ("ID"); and sending, from the central node to the end-node-instances, a dense acknowledgement message ("dense ACK") acknowledging receipt of the data messages but not explicitly identifying any of the IDs of the corresponding end-node-instances.

Another aspect of the present invention provides, in a network including a central node and multiple, message-sourceable end nodes, a method of operating a given instance of the end nodes to infer a delivery-condition at the central node of a data message sent by the given end-node-instance, the method comprising: sending, from the given end-node-instance to the central node, a given data message including an at least substantially unique identification ("ID") of the end-node-instance; receiving, at the given end-node-instance from the central node, a dense acknowledgement message ("dense ACK") including a payload indicating receipt of multiple data messages but not explicitly identifying an ID of the given end-node-instance nor IDs of other end-node-instances corresponding to the received messages, respectively; manipulating the payload of the dense ACK; and inferring a delivery-condition at the central node of the given data message based on the manipulated payload.

Yet another aspect of the present invention provides an apparatus for acknowledging received messages, the apparatus comprising: an interface and a processor. The interface is configured to receive multiple data messages from multiple instances of message-sourceable end nodes, respectively, each end-node-instance have an at least substantially unique identification ("ID"). The processor is configured to generate a dense acknowledgement message ("dense ACK") acknowledging receipt of the data messages but not explicitly identifying any of the IDs of the corresponding end-node-instances. The wireless interface is further configured to send, to the end-node-instances, the dense ACK.

Yet another aspect of the present invention provides, in a network including a central node and instances of a message-sourceable end node apparatus, a given instance of the end node apparatus being configured to infer a delivery-condition at the central node of a data message sent by the given instance, the given instance of the end node apparatus comprising: an interface and a processor. The interface is configured to: send, to the central node, a given data message including an at least substantially unique identification ("ID") of the end-node-instance; and receive, from the central node, a dense acknowledgement message ("dense ACK") including a payload indicating receipt of multiple data messages but not explicitly identifying an ID of the given end-node-instance nor IDs of other end-node-instances corresponding to the received messages, respectively. The process is configured to: manipulate the payload of the dense ACK; and infer a delivery-condition at the central node of the given data message based on the manipulated payload.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1:
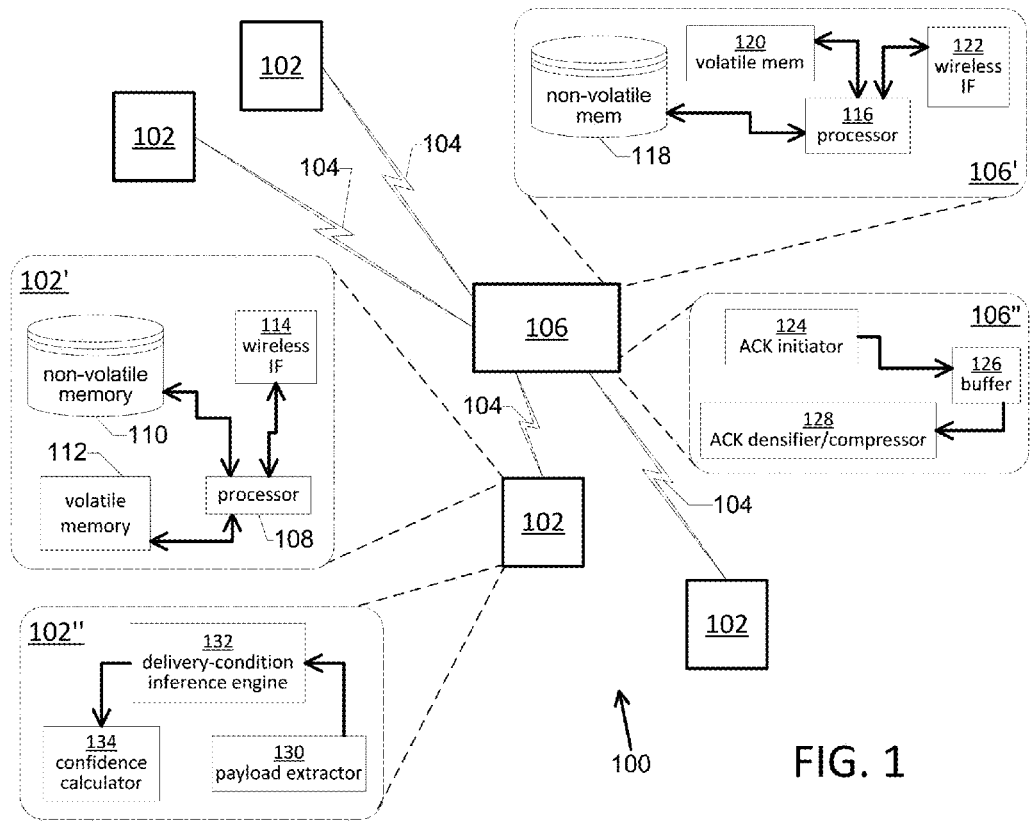
FIG. 1 is a block diagram of wireless network, for example, a long-range, low-power network, according to an embodiment of the present invention.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing embodiments of the present invention, among other things, the inventors thereof:

realized that, in terms of making a decision to re-transmit a message, a high-confidence that the message was not received is as significant to the decision-making-process as a high confidence that the message had been received;

realized that, regarding an inferred delivery-condition (at the intended recipient of a message) as inferred by the message-sender, the threshold of confidence below which a retransmission is warranted varies depending on a number of factors, e.g., the priority of the message-sender; the priority of the data that is being communicated via the message, etc.; and realized that a dense acknowledgement message ("dense ACK") which acknowledges receipt of multiple data messages but does not explicitly identify any of the IDs of the corresponding end nodes not only conserves the wireless bandwidth but is tolerable in a system with variable confidence-thresholds.

One or more embodiments of the present invention provide such dense ACK capability.

FIG. 1 is a block diagram of wireless network 100, for example, a long-range, low-power network, according to an embodiment of the present invention.

In FIG. 1, wireless network 100 can be compatible, e.g., with the 6LoWPAN standard, the LoRaWAN standard, etc. Network 100 includes: instances of end nodes 102; and a central node 106, e.g., a base station. Via wireless communication sessions 104, instances of end node 102 communicate with central node 106, respectively. For example, an instance of end node 102 can send a data message to central node 106. Accordingly, instances of end node 102 can be described as message-sourceable.

In terms of physical components (as illustrated by exploded view 102'), each instance of end node 102 includes: one or more instances of a processor 108; one or more instances of non-volatile memory 110; one or more instances of volatile memory 112; and a wireless interface 114. Also, in terms of physical components (as illustrated by exploded view 106', each instance of central node 106 includes: one or more instances of a processor 116; one or more instances of non-volatile memory 118; one or more instances of volatile memory 120; and a wireless interface 122.

In terms of functional units (as illustrated by exploded view 102"), each instance of end node 102 includes: a payload extractor 130; a delivery-condition inference engine 132; and a confidence calculator 134. Also, in terms of functional units (as illustrated by exploded view 106"), each instance of central node 106 includes: an acknowledgement ("ACK") initiator 124; a buffer 126; and an ACK densifier/compressor (hereinafter "ACK densifier") 128. For a given instance of end node 102, such functional units can be implemented at least in part, e.g., as executable code stored in one or more of the memories thereof (noted above), with such code being executable by one or more of the processors (noted above), respectively. Such implementations can conform to the communication-layer diagram of FIG. 3 (discussed below).

Figure 2:
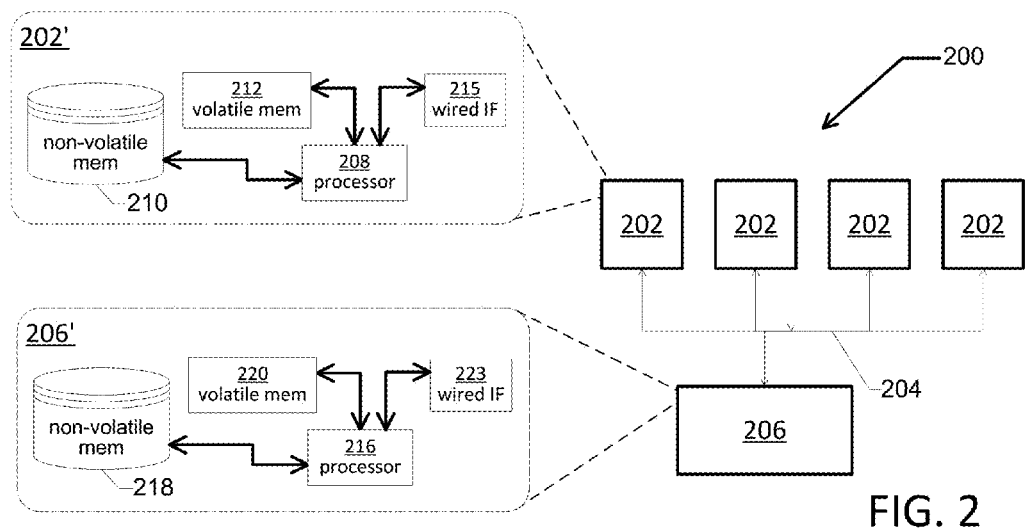
FIG. 2 is a block diagram of wired network, according to an embodiment of the present invention.

FIG. 2 is a block diagram of wired network 200, according to an embodiment of the present invention.

In FIG. 2, wired network 100 is compatible, e.g., with the Ethernet standard. Network 200 includes: a plurality of N instances of end nodes 202 (where N is a positive integer and 2≤N); and a central node 206. Via a wired connection 204, instances of end node 102 communicate with central node 106, respectively.

In terms of physical components (as illustrated by exploded view 202'), each instance of end node 202 includes: one or more instances of a processor 208; one or more instances of non-volatile memory 210; one or more instances of volatile memory 212; and a wired interface 214. Also, in terms of physical components (as illustrated by exploded view 206', each instance of central node 206 includes: one or more instances of a processor 216; one or more instances of non-volatile memory 218; one or more instances of volatile memory 220; and a wired interface 122. The functional units of each end node 202 can be, e.g., the same as in exploded view 102" of end node 102. Similarly, the functional units of central node 206, e.g., can include the functional units illustrated in exploded view 106" of central node 106.

Figure 3:
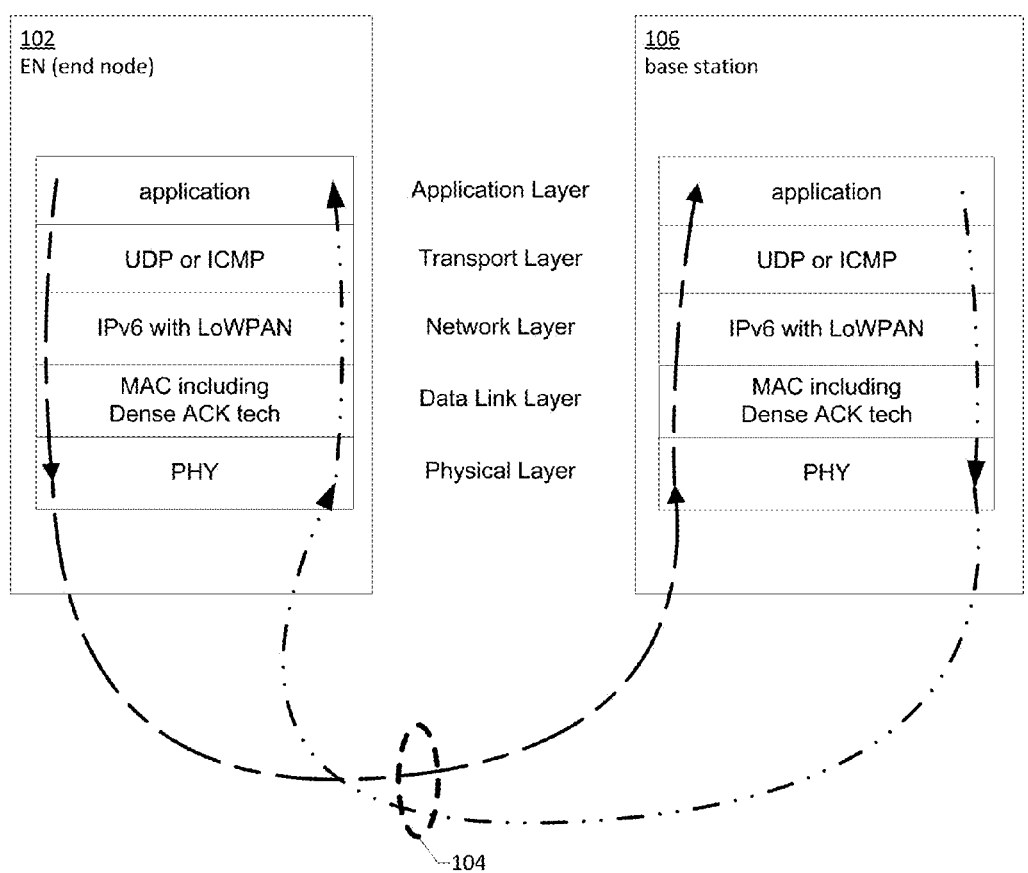
FIG. 3 is a communication-layer diagram illustrating the path of flow during a communication session between the central node and an instance of the end node, according to an embodiment of the present invention.

FIG. 3 is a communication-layer diagram illustrating the path of flow during an instance of communication session 104 between central node 106 and an instance of end node 102, according to an embodiment of the present invention.

Each instance of end node 102 as well as each of central node 106 can be implemented at least in part, e.g., as executable code stored in one or more of the noted (above) memories thereof and executed by one or more of the noted (above) processor units thereof, respectively. Such implementations can conform to the communication-layer diagram of FIG. 3.

More particularly, central node 106 and each instance of end node 102 can have a stack based (in part); on industry-standard layers. The layers illustrated in FIG. 3 represent but one example of combinations of layers that can be included in such stacks, respectively. Such layers, from bottom to top, for example (as illustrated in FIG. 1C), can include: a physical layer; a data link (or MAC) layer that includes dense acknowledgement messaging-technology (see discussion below); a network layer (e.g., an IP with LoWPAN) layer; a transport layer (e.g., a UDP layer or ICMP layer); and an application layer. Alternatively, different combinations of layers could be used in the stack.

Figure 4A:
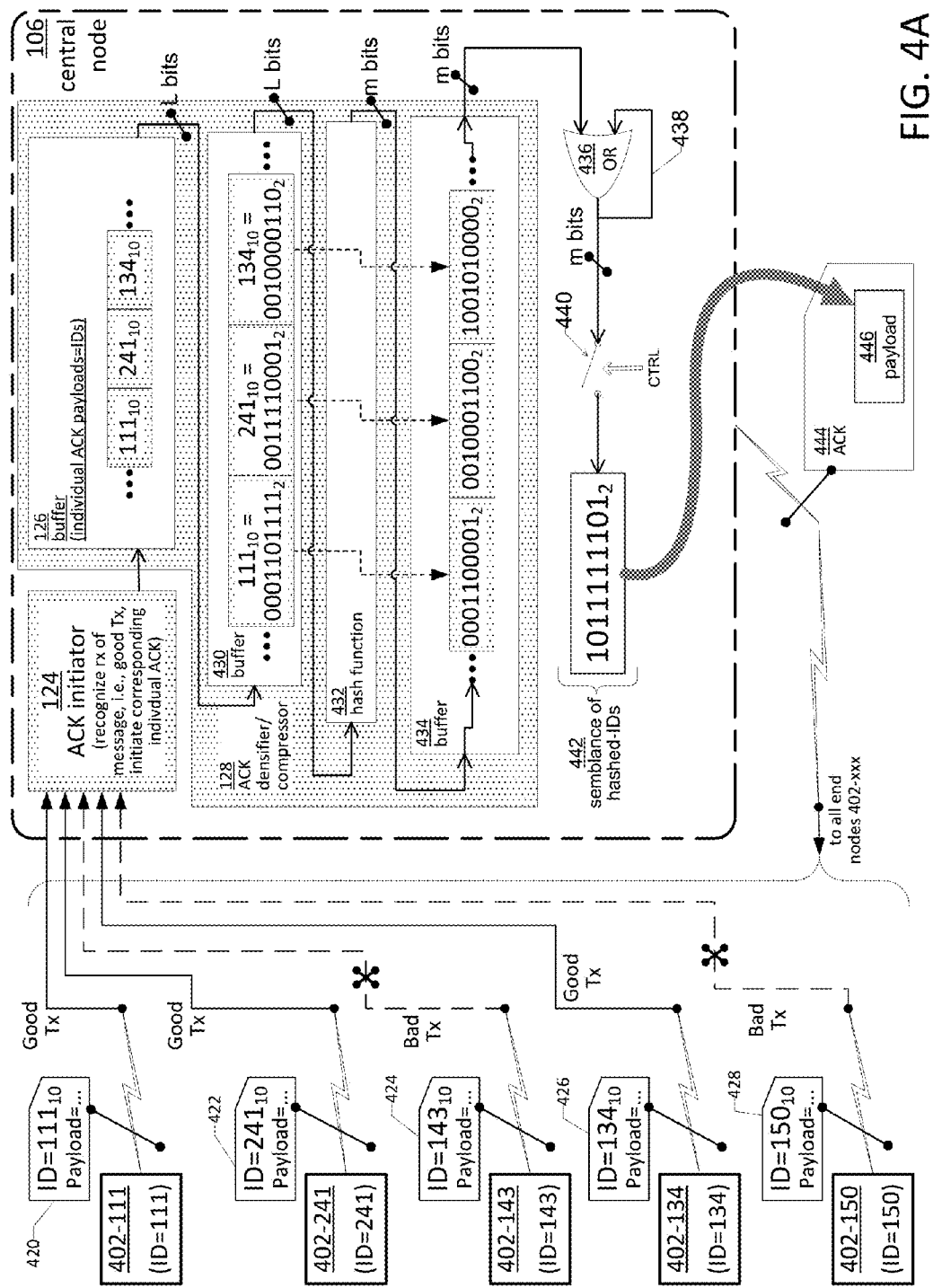
FIG. 4A is a block diagram illustrating an example of the generation (and subsequent broadcast/multi-cast) of a dense ACK message from the central node to instances of the end node in response to receipt of one or more messages from one or more instances of the end node, respectively, according to an embodiment of the present invention.

FIG. 4A is a block diagram illustrating an example of how the generation (and subsequent broadcast/multi-cast) of a dense acknowledgement message (hereinafter "dense ACK") 444 from central node 106 to instances of end node 102 in response to receipt of one or more messages from one or more instances of end node 102, respectively, according to an embodiment of the present invention.

For simplicity, in FIG. 4A, only four instances of end node 102 are illustrated, namely, end nodes 402-111, 402-241, 402-143, 402-134 and 402-150. Each instance of end node 102 has an identification ("ID"), e.g., an at least substantially unique ID. End nodes 402-111, 402-241, 402-143, 402-134 and 402-150 have corresponding IDs $111_{10}$, $241_{10}$, $143_{10}$, $134_{10}$ and $150_{10}$, respectively.

In FIG. 4A, each of end nodes 402-111, 402-241, 402-143, 402-134 and 402-150 has attempted to send a message 420-428, respectively, wirelessly to central node 106. Among other things, a message from a given instance of end node 102 includes: an identification of the source of the message, i.e., the corresponding ID of the given instance of end node 102: and a payload, e.g., sampled data collected thereby, status information thereof, etc.

For the example situation illustrated in FIG. 4A, it is assumed that messages 420, 422 and 426 are received by central node 106 (and thus each represent a 'good transmission'), whereas messages 424 and 428 are not received by central node 106 (and thus each represent a 'bad transmission').

Within central node 106, ACK initiator 124 is configured to recognize the receipt of messages from instances of end node 102, and then initiate a corresponding individual ACK of each received message (though such individual ACK messages ultimately are NOT sent, as discussed in more detail below). To place an upper bound on the number of messages that can be acknowledged in common by each instance of dense ACK 444, central node 106 is configured to generate an instance of a dense ACK 444 once for each elapsed instance a listening interval (discussed in more detail below). For example, central node 106 broadcasts a periodic beacon message (e.g., at a rate of 1.5 Hz) by which instances of end node 102 can recognize the elapse of listening intervals. Also, for example, each of the N instances of end node 102 can be configured to transmit a message to central node 106 at most only once in a given listening interval. Such an arrangement has a practical effect of placing an upper bound on the maximum number of messages that central node 106 can receive in any given interval, namely N messages corresponding to the N instances of end node 102. To accommodate different numbers of instances of end node 102, central node 106 can be configured with one or more listening channels in proportional to the number of instances of end node 102.

For example, during an $(r+1)^{th}$ listening interval (where r is a positive integer), central node 106 is configured to generate and wirelessly send an instance of dense ACK 444 regarding the preceding $r^{th}$ listening interval. If no messages were received during the $r^{th}$ listening interval, then the corresponding instance of dense ACK 444 represents, in effect, a negative ACK ("NACK").

Benefits of using dense ACK 444 include a reduced consumption of bandwidth otherwise dedicated to sending a commensurate number of individual ACKs.

More particularly, ACK-densifier 128 is configured to generate (for each instance of a dense ACK 444) the corresponding instance of a payload 446, i.e., one for each elapsed instance of the listening interval. For example, during an $(r+1)^{th}$ listening interval (where r is a positive integer), ACK-densifier 128 is configured to generate an instance of payload 446 that concerns the preceding $r^{th}$ listening interval, i.e., which indirectly identifies (as discussed in more detail below) each instance of end node 102 that sourced one of the messages received by ACK initiator 124 during the $r^{th}$ listening interval.

The payload of a given received message includes the corresponding ID of the given instance of end node 102 which sourced the given message. ACK initiator 124 can, e.g., initiate the individual ACK of the given received message by extracting the ID contained in the given message and sending the extracted ID to buffer 126 as the inchoate payload of a would-be corresponding individual ACK. Here, such an individual ACK is described as 'would-be' because central node 106 does not send conventional individual ACKs but instead sends a dense ACK. In a circumstance that only one message is received during the $r^{th}$ listening interval, the resulting instance of dense ACK sent during the $(r+1)^{th}$ listening interval will only acknowledge one message nevertheless a dense ACK that acknowledges only one message is substantially different than a conventional individual ACK (as will be discussed in more detail below).

Buffer 126 can be configured, e.g., as a shift register. As an initialization at the beginning of the $(r+1)^{th}$ listening interval, inchoate payloads of would-be individual ACKs generated during the $r^{th}$ listening interval can be flushed out of buffer 126 as preparation to receive inchoate payloads of would-be individual ACKs any messages the might be received during the $(r+1)^{th}$ listening interval. In FIG. 4A, buffer 126 is illustrated as buffering three would-be individual ACKs whose payloads are illustrated using decimal notation (for compactness of illustration), namely $111_{10}$, $241_{10}$ and $134_{10}$.

ACK-densifier 128 includes: a buffer 430; a hash function 432; a buffer 434; a logical OR function 436; and a sampler 438. Each of buffers 430 and 434 can be configured, e.g., as a shift register. As another initialization at the beginning of the $(r+1)^{th}$ listening interval, the contents which are shifted out of buffer 126 can be shifted into buffer 430. Other than at the beginning of the $(r+1)^{th}$ listening interval, i.e., subsequently during the $(r+1)^{th}$ listening interval, the contents of buffer 126 and buffer 430 typically (though not necessarily) are shifted asynchronously. In FIG. 4A, buffer 430 is illustrated as buffering three would-be individual ACKs whose payloads are illustrated using both decimal notation and binary notation, namely $111_{10}=0001101111_2$, $241_{10}=0011110001_2$ and $134_{10}=0010000110_2$.

Subsequently during the $(r+1)^{th}$ listening interval, buffer 126 can shift inchoate payloads of would-be individual ACKs generated during the $r^{th}$ listening interval into hash function 432 (discussed in more detail below). Each instance of an inchoate payload of a would-be individual ACK that is shifted into hash function 432 is converted into a hashed ID (again, as will be discussed in more detail below). In FIG. 4A, buffer 434 is illustrated as buffering three hashed IDs which are illustrated using both binary notation, namely $0001100001_2$, $0010001100_2$ and $1001010000_2$.

For a given parameter set (L, m, k), an implementation of hash function 432 should: accept a binary input of length L, and produce a binary output of length m; be deterministic such that the same input produces the same output every single time (for every possible input); be reproducible such that it can be implemented on separate, independent systems that cannot communicate with each other and yet it always will produce the same result for a given input in all separate and independent implementations; and generate a binary vector that has at most k bits equal to '1', with the remaining bits equal to '0', with this binary vector being the output of hash function 432. Hash function 432 typically will be lossy.

An example of a first approach to implementing hash function 432 is to generate the binary output vector in such a way that each of the k bits is selected with a uniform distribution among the m bit positions, with the k random bit positions being independent and identically distributed. Under the first approach, it is possible for less than k bits to be set to '1' in the final output.

An example of a second approach to implementing hash function 432 is to generate the binary output vector in such a way that each of the k bits is selected with a uniform distribution among the remaining bit positions that are set to '0'. Under the second approach, there will always be exactly k bits equal to '1' in the final output. Other approaches to implementing hash function 432 are contemplated.

In the context of FIG. 4A, examples of outputs of hash function 432 are provided as follows: ID=111 is converted into hashed-ID=0001100001; ID=241 is converted into 0010001100; and ID=134 is converted into 1001010000.

The output of buffer 434 is connected to a first input of OR function 436. The output of OR gate 436 is connected to a second input of OR function 436 in a feedback loop 438. As yet another initialization at the beginning of the $(r+1)^{th}$ listening interval, the output of OR function 436 is reset, e.g., to logical zero. Thereafter (albeit in the $(r+1)^{th}$ listening interval), at a time increment t+1 (where t is a non-negative integer), OR function 436 operates to logically-OR together an instance of a hashed-ID with its output (namely, the output of OR function 436) from the preceding time increment t.

Sampler 440 (illustrated in FIG. 4A as a switch controlled by a signal CTRL) is provided at the output of OR function 436. After OR function 436 has operated on the last of the hashed-IDs shifted from buffer 434, the output of OR function 436 is sampled via sampler 440 to provide a densified (or, in other words, compressed) version 442 of the hashed-IDs received from buffer 434, the latter corresponding to the IDs of the instances of end node 102 from which ACK initiator 124 successfully received messages during the $r^{th}$ listening interval. Densified version 442 of the hashed-IDs is a semblance of the un-hashed individual IDs, and is included in a payload 446 of a dense ACK 444 generated and sent by central node 106 during the $(r+1)^{th}$ listening interval. Densified version 442 of the hashed-IDs is referred to as a semblance to connote that densified version 442 does not explicitly identify any of the unhashed individual IDs. In FIG. 4A, semblance 442 is illustrated using binary notation, namely $1011111101_2$.

In the example illustrated in FIG. 4A, the following parameter values were used: N=5; W=3, L=8, and m=10; where N (again) is the number of instances of end node 102; W is the number of the N independent transmissions from the N instances of end node 102 that are received by central node 106, where $0 \leq W \leq N$; L is the bit-length an end-node-ID; and m is the bit-length of the hashed-IDs as well as the bit-length of semblance 442. If an instance of dense ACK 444 was not used and instead a 'block' ACK was used whose payload included the full ID of each instance of end node 102, the required bit-length of the block-ACK payload would have been (W*L)=(3*8)=24 bits. By contrast, the bit-length of semblance 442 is 10. As such, relative to payload of a block ACK, the payload of an instance of dense ACK 444 can be described as compressed; this is another example of a benefit (noted above) of using instances of dense ACK 444, namely reducing bandwidth consumption. To achieve greater measures of compression, a yet more lossy variant of compression can be used (as discussed below).

Figure 4B:
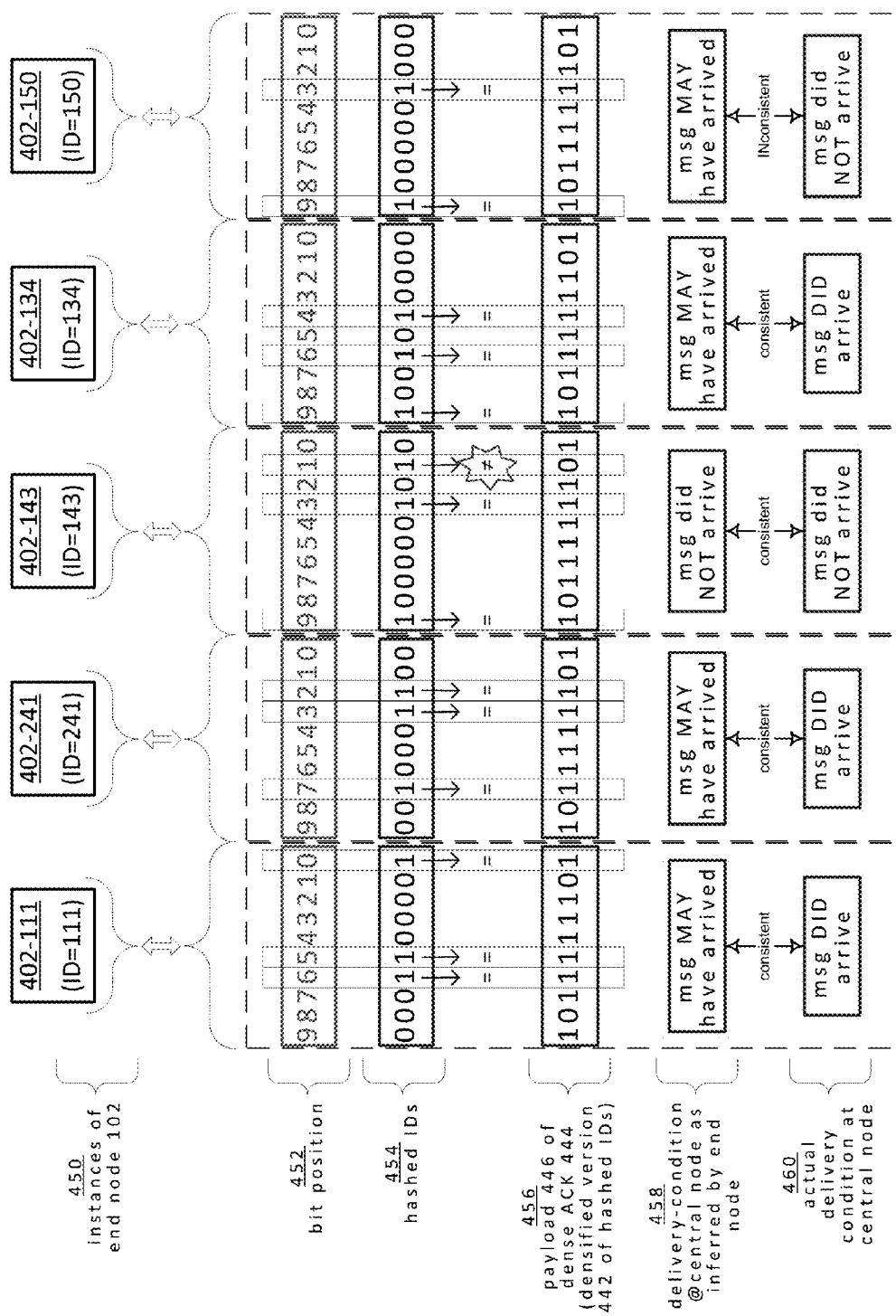
FIG. 4B is a quasi-bit-state diagram illustrating a continuation of the example of FIG. 4A, according to an embodiment of the present invention, that thereby provides context for discussing the operation of the functional units of instances of the end node.

FIG. 4B is a quasi-bit-state diagram illustrating a continuation of the example of FIG. 4A, according to an embodiment of the present invention, that thereby provides context for discussing the operation of the functional units of instances of end node 102.

When an instance of dense ACK 444 is received by instances of end node 102, each is operable to bit-wise compare payload 446 of dense ACK 444 to its hashed-ID, respectively. In particular, each instance of end node 102 checks if payload 46 has logical-one values in the same positions as does its hashed-ID. If any one bit in payload 46 is NOT correspondingly set to a value of logical-one, then the given instance of end node 102 can infer with 100% certainty that its message was not received by central node 106, thus requiring the given instance of end node 102 to re-transmit the original message.

If all of the bits having a logical-one value in the hashed-ID are correspondingly set to a value of logical-one in payload 46, then the given instance of end node 102 knows only that its message MAY have arrived. The given instance of end node 102 can then calculate the probability ('p') that its message may have arrived (as discussed below). The calculated probability p can be input to a re-transmission decision algorithm by which the given instance of end node 102 can decide whether to retransmit the original message.

In FIG. 4B, the quasi-bit-state diagram is organized into six rows and 5 columns, the latter corresponding to the five instances of end node 102 illustrated in FIG. 4A. Row 450 of FIG. 4B lists end nodes 402-111, 402-241, 402-143, 402-134 and 402-150 (which, again, have IDs 111, 241, 143, 134 and 150, respectively). Row 454 lists the hashed IDs corresponding to end nodes 402-111, 402-241, 402-143, 402-134 and 402-150, respectively. To simplify discussion, row 452 lists the bit-position numbers of the bits in the hashed-IDs of row 454, where the right-most bit position is referred to as the zeroith bit position ('bit zero, or b0) and the left-most position is referred to as the ninth bit position ('bit nine' or b9).

For each column in FIG. 4B, row 456 reproduces the example instance of payload 446 of the instance of dense ACK 444 illustrated in FIG. 4A in bit-position vertical alignment with the hashed-IDs of row 454. For any given column: row 458 lists the inferred delivery-condition at central node 106, as inferred by the corresponding instance of end node 102 regarding the message sent thereby; and row 458 lists the actual delivery-condition at central node 106.

Each of end nodes 402-111, 402-241, 402-134 and 402-150 have inferred (as the delivery-condition) that the corresponding message MAY have arrived at central node 106. End node 402-143 has inferred that its message was NOT received by central node 106. According to row 460, the messages end nodes 402-111, 402-241 and 402-134 were received by central node 106, but the messages end nodes 402-143 and 402-150 were NOT received. As such, the inferred delivery-conditions as inferred by end nodes 402-111, 402-241, 402-143 and 402-134 were consistent with actual delivery-conditions, whereas the inferred delivery-condition inferred by end node 150 was inconsistent with the actual delivery-condition.

From the perspective of a given instance of end node 102, for purposes of inferring the delivery-condition at central node 106 of the message that it (the given instance of end node 102) has sent, logical-zero values in payload 446 of dense ACK 444, i.e., in semblance 442 of the un-hashed individual IDs, take on greater inferential-significance than logical-one values because a logical-zero in dense ACK 444 where there is a corresponding logical-one in the hashed ID indicates with 100% certainty that the corresponding message was not received by central node. Particularly, in row 454: the hashed-ID of end node 402-111 has logical-one values at three bit positions (namely, b0, b5 and b6); the hashed-ID of end-node 401-241 has logical-one values at three bit positions (namely, b2, b3 and b7); the hashed-ID of end node 402-143 has logical-one values at three bit positions (namely, b1, b3 and b9); the hashed-ID of end node 402-134 has logical-one values at three bit positions (namely, b4, b6 and b9); and the hashed-ID of end node 402-150 has logical-one values at two bit positions (namely, b3 and b9).

A bit-wise comparison of each hashed ID in row 454 to the example values in payload 446 of dense ACK 444 in row 456 reveals that only one hashed ID has a logical-one-mismatch, namely, a logical-one in a bit position for which the value of the corresponding bit position in payload 446 of dense ACK 444 is a logical-zero, namely the hashed-ID of end node 402-143 at b1. Existence of a logical-one-mismatch is the key to end node 143 inferring that its message was not received by central node 106.

The incorrect inference of the delivery-condition of the message sent by end node 402-150 is due, in part, to there being fewer logical-one-matches in the hashed-ID of end node 402-150 than in the other hashed-IDS, namely two instead of three. Fewer logical-one-matches mean that there is less information on which to base the inference, which increases the risk of the inference being incorrect.

It is noted that the compression discussed above is not invertible. Consequently, the corresponding de-compression is imperfect. In other words, based only on payload 446 of dense ACK 444, it is impossible to reconstruct the sequence of hashed-IDs from which it was formed with 100% certainty, due to the non-invertible nature of both hash function 432 and OR function 436. Such compression is an example of lossy compression.

Greater ratios of compression are possible with lossy compression as contrasted with lossless compression. As a result, use of lossy compression consumes relatively fewer transmission resources because payload 446 of dense ACK 444 is of shorter bit-length than would be possible with lossless compression.

Though an instance of end node 102 can know with 100% certainty that its message was not received by central node 106, nevertheless there will be partial ambiguity. The partial ambiguity associated with the use of dense ACK 444 is that an instance of end node 102 will not know with 100% certainty if its message was received by central node 106.

Figure 5:
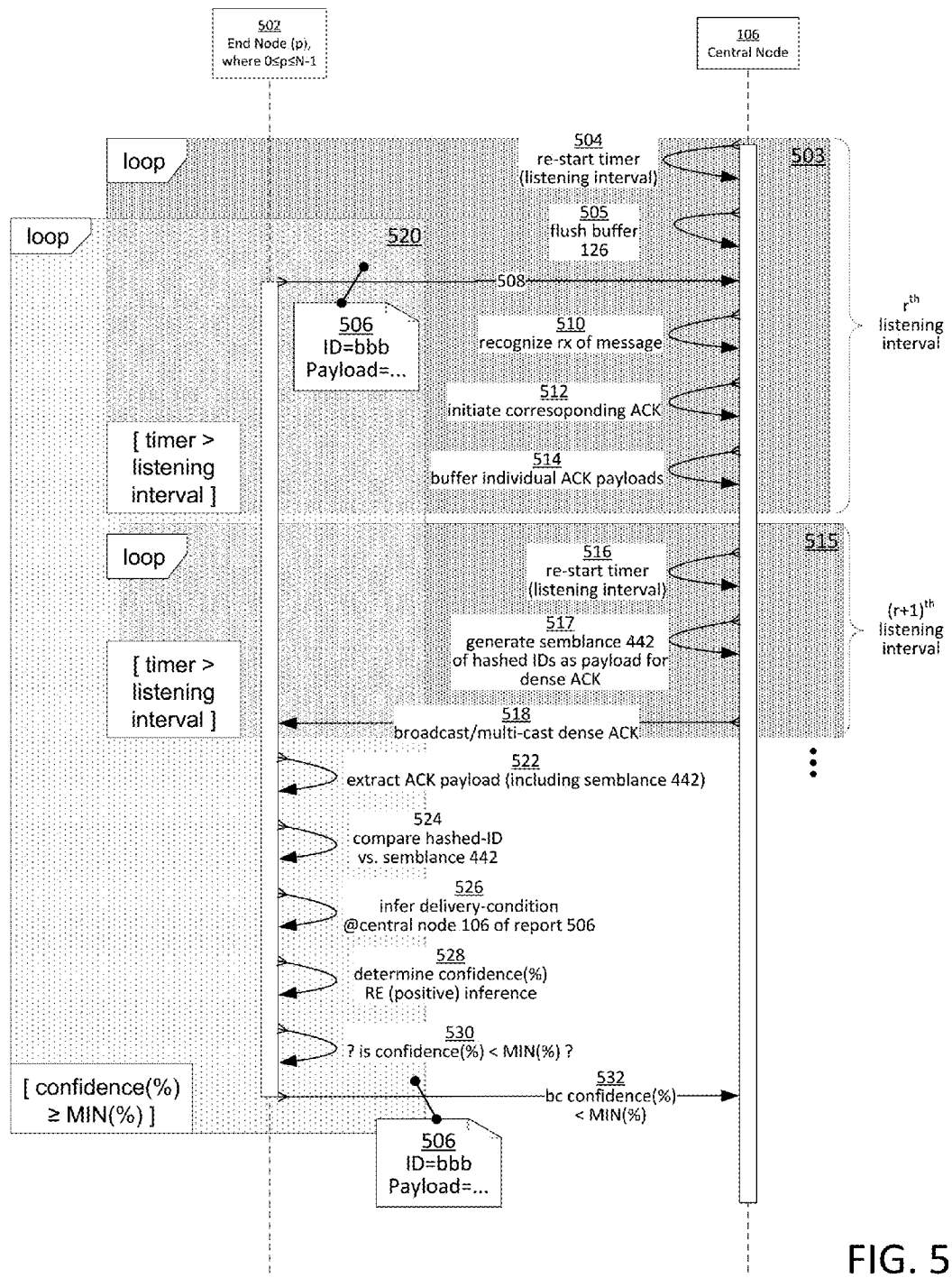
FIG. 5 is a sequence diagram showing interactions between an instance of the end node and the central node, according to an embodiment of the present invention.

FIG. 5 is a sequence diagram showing interactions between an instance 502 of end node 102 and a central node 106, according to an embodiment of the present invention.

In FIG. 5, three loops (503, 515 and 520) are illustrated. Loops 503 and 515 are focused on operations of central node 106. Loop 520 is focused on operations of end node 502. Though including substantially the same operations, the illustration of loop 503 focuses on the operations of ACK initiator 124 and buffer 126, whereas the illustration of loop 515 is focused on operations of ACK densifier 128. Loops 502 and 515 have the same exit condition, which arises when the elapsed time measured by the timer equals the listening interval.

Flow begins at action 508, where central node 106 re-starts a timer by which the elapse of the $r^{th}$ listening interval is measured. At action 504, central node 106 flushes buffer 126, thereby filling buffer 430. At some point during the $r^{th}$ listening interval, it is assumed that end node 502 transmits a message 506 to central node 106, as indicated by action 508. At action 510, central node 106 (via ACK initiator 124) recognizes that it has received a message. At action 512, central node 106 (via ACK initiator 124) initiates an individual ACK of the given received message by extracting the ID contained in the given message. At action 514, central node 106 (via buffer 126) buffers the extracted ID along with any other (if any) extracted IDs that have already been received.

Loop 515 is another instance of loop 503. ACK initiator 124, buffer 126 and ACK densifier 128 operate during loop 503. For simplicity, loop 503 is focused on the operations of ACK initiator 124 and buffer 126 as they relate to the $r^{th}$ listening interval, and loop 515 is focused on the operations of ACK densifier 128 during the $(r+1)^{th}$ listening interval.

At action 516, central node 106 re-starts the timer by which the elapse of the $(r+1)^{th}$ listening interval is measured. At action 517, central node 106 generates (via ACK densifier 128) semblance 442 of the un-hashed individual IDs (of the instances of end node 102 from which ACK initiator 124 successfully received messages during the $r^{th}$ listening interval). Again semblance 442 is a densified (or, in other words, compressed) version 442 of the hashed-IDs received from buffer 434, the latter corresponding to the IDs of the instances of end node 102 from which ACK initiator 124 successfully received messages during the $r^{th}$ listening interval. Semblance 442 of the hashed-IDs is provided as a payload 446 of a dense ACK 444 generated and sent (at action 518) during the $(r+1)^{th}$ listening interval by central node 106.

At action 522, end node 502 (via payload extractor 130) extracts payload 446 of dense ACK 444, which includes extracting semblance 442. At action 524, end node 502 (via delivery-condition inference engine 132) compares (see the discussion of FIG. 4A above) semblance 442 against its hashed-ID. Actions 522-524 can be described as examples of manipulating payload 446 of dense ACK 444, i.e., as examples of manipulating semblance 442. Based on the results of the comparison, at action 526, end node 502 (via delivery-condition inference engine 132) infers a delivery-condition at central node 106 of the message that it (the given instance of end node 102) has sent. At action 528, end node 502 (via delivery-condition inference engine 132) determines a confidence level (e.g., a percentage or probability, p) that the inferred (positive) delivery-condition is accurate. Actions 524-528 are discussed in more detail below in the context of the flowchart of FIG. 7.

At action 530, end node 502 (via delivery-condition inference engine 132), the confidence level is input to a re-transmission decision algorithm by which end node 502 can decide the original message needs to be re-transmitted, e.g., re-transmit (as indicated by action 532) if the confidence level is less than the a threshold, MIN. The exit condition of loop 520 arises when confidence level is greater than or equal to the threshold, MIN.

Figure 6A:
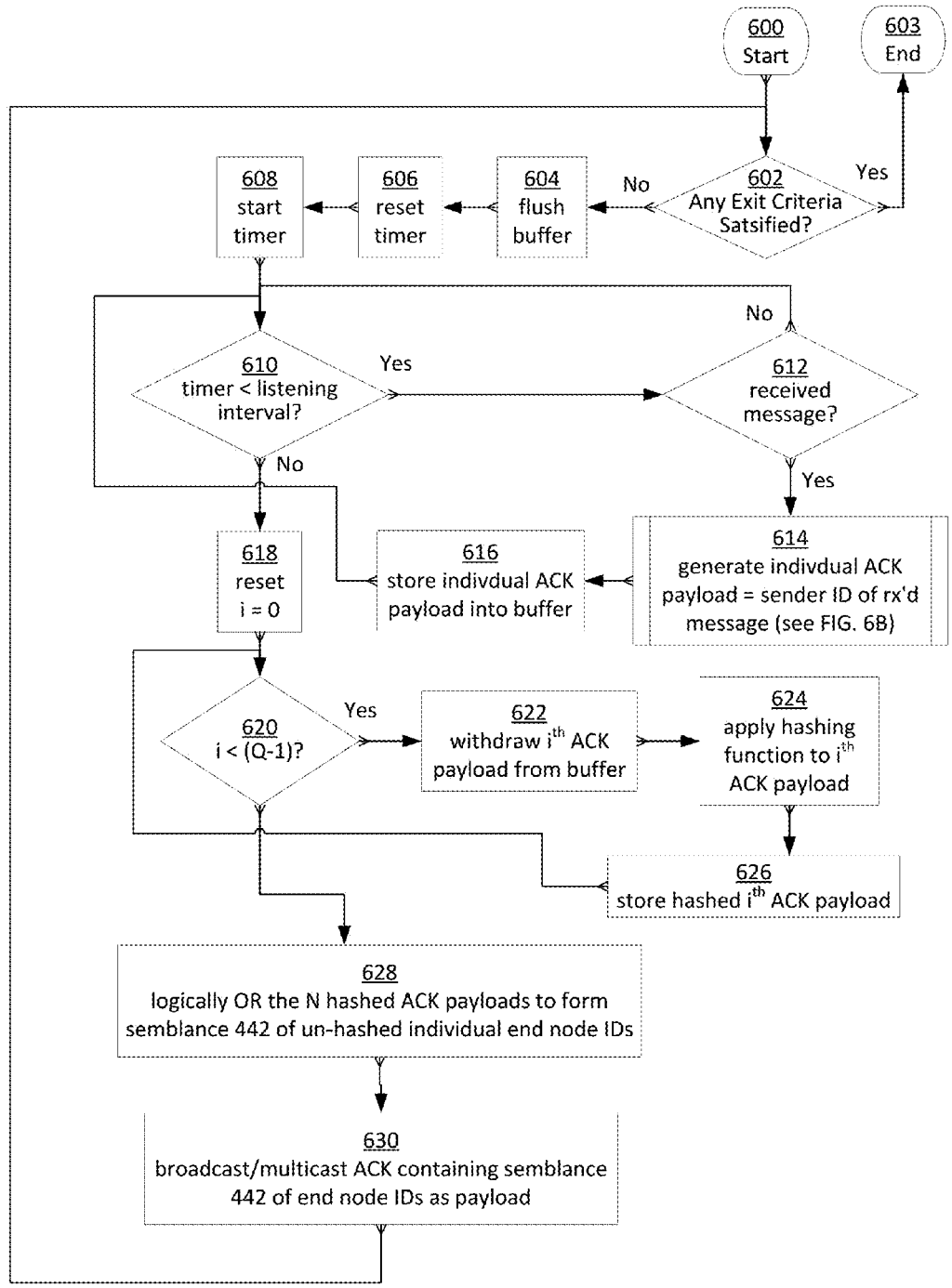
FIG. 6A is a flowchart illustrating how the central node generates an instance of the dense ACK, according to an embodiment of the present invention.

FIG. 6A is a flowchart illustrating how central node 106 generates an instance of dense ACK 444, according to an embodiment of the present invention.

In FIG. 6A, there are three loops corresponding to loops 503 and 515, respectively, of FIG. 5. As a general design consideration, no loop should be infinite, i.e., inescapable. Accordingly, flow in FIG. 6A starts at block 600 and proceeds to decision block 602, where processor 116 decides if any exit criteria have been satisfied. If the decision is yes (one or more of the exit criteria are satisfied), then flow proceeds to block 603 and ends. If the decision is no (none of the exit criteria has been satisfied), then flow proceeds to block 604.

At block 604, as preparation for iterating the first loop, buffer 126 is flushed at block 604, thereby shifting its contents into buffer 430. From block 604, flow proceeds to 606, where the timer is re-sent, that timer being the timer by which the elapse of a given listening interval is measured. Flow proceeds from block 606 to block 608, where the timer is started. From block 608, flow proceeds to decision block 610, where processor 116 determines if the elapsed time measured by the timer is less than the listening interval. If the decision is no (the elapsed time is equal to or greater than the listening interval), then flow proceeds to block 618 (discussed below), thereby starting the next loop.

If the outcome of decision block 610 is yes (the elapsed time is less than the listening interval), then flow proceeds to decision block 612. At decision block 612, ACK initiator 124 (via processor 116) determines if a message (or another message) has been received. If the decision is no (no message received), then flow loops back to decision block 610. If the outcome of decision block 612 is yes (a message or another message has been received), then flow proceeds to block 614.

At block 614, ACK initiator 124 (via processor 116) generates a payload for an individual ACK, the payload including at least the ACK of the instance of end node 102 which sent the corresponding message that was received. Block 614 is a sub-routine that is discussed in more detail below in the context of FIG. 6B. From block 614, flow proceeds to block 616, where the individual ACK payload is stored in buffer 126. From block 616, flow proceeds back up to decision block 610.

If the decision is no (the elapsed time is equal to or greater than the listening interval), then (as noted above), flow proceeds to block 618 where a loop counter variable, i, is reset to zero. From block 618, flow proceeds to a decision block 620, where ACK densifier 128 (via processor 116) determines if i<(Q−1), where Q is the number of messages received during the given listening interval. If the outcome of decision block 620 is yes (i<Q), then flow proceeds to block 622, where buffer 430 (via processor 116) shifts the $i^{th}$ instance of individual ACK payload (i.e., an ID of an instance of end node 102 from which ACK initiator 124 has received a message) into hash function 432. From block 622, flow proceeds to block 624, where hashing function 432 (via processor 116) operates on the $i^{th}$ instance of individual ACK payload. From block 624, flow proceeds to block 626, where ACK densifier 128 stores the hashed version of the $i^{th}$ instance of individual ACK payload into buffer 434. From block 626, flow loops back to decision block 620.

If the outcome of decision block 620 is yes (i≥Q), then flow proceeds to block 628, where ACK densifier 128 (via OR function 436 (via processor 116)) logically ORs together the hashed versions of the individual ACK payloads stored in buffer 434 to form a semblance 442 of the un-hashed individual IDs. From block 628, flow proceeds to block 630, where central node 106 (via processor 116 and wireless IF 122) generates an instance of dense ACK 44 that includes in its payload 46 semblance 442 of the un-hashed individual ACKs. From block 630, flow loops back to decision block 602.

Figure 6B:
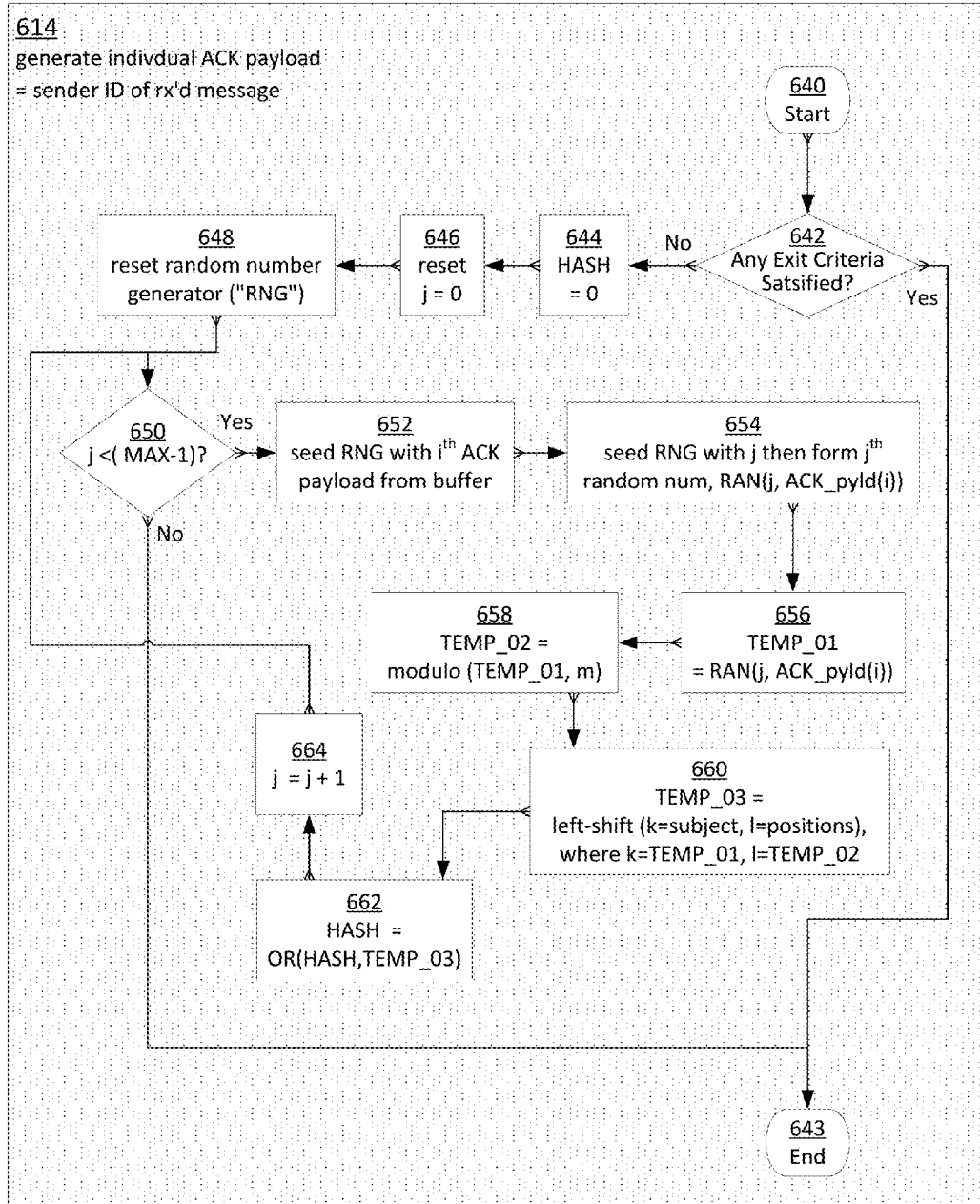
FIG. 6B is a flowchart illustrating the operation of the hash function of the ACK densifier, according to an embodiment of the present invention.

FIG. 6B is a flowchart illustrating the operation of hash function 432 of ACK densifier 128, according to an embodiment of the present invention.

The flowchart of FIG. 6B, overall, can be regarded as a loop. As a general design consideration, no loop should be infinite, i.e., inescapable. Accordingly, flow in FIG. 6B starts at block 640 and proceeds to decision block 642, where processor 116 decides if any exit criteria have been satisfied. If the decision is yes (one or more of the exit criteria are satisfied), then flow proceeds to block 643 and ends. If the decision is no (none of the exit criteria has been satisfied), then flow proceeds to block 644.

At block 644 of FIG. 6B, a variable HASH is set to zero. From block 644, flow proceeds to block 646, where a looping count j is reset, i.e., is set to zero. From block 646, flow proceeds to block 648, where a random number generator ("RNG") is reset. From block 648, flow proceeds to decision block 650, where processor 116 determines if the loop count is less than a maximum reference value, MAX, i.e., if j<MAX. If the decision is yes (j<MAX), then flow proceeds to block 652, where the RNG is seeded with the $i^{th}$ ACK payload from buffer 434. From block 652, flow proceeds to block 654, where the RNG is further seeded with j so as to generate the $j^{th}$ random number, RAN(j, ACK_pyld (i)), where ACK_pyld(i) denotes the $i^{th}$ ACK payload.

From block 654, flow proceeds to block 656, where variable TEMP_01 is set equal to RAN(j, ACK_pyld(i)). From block 656, flow proceeds to block 658, where variable TEMP_02 is set equal to modulo (TEMP_01, m), i.e., the remainder of a modulo operation in which TEMP_01 is divided by m (where, again, m is the bit-length of the hashed-IDs as well as the semblance 442 thereof). From block 658, flow proceeds to block 660, where a variable TEMP_03 is set equal to left-shift(TEMP_01, TEMP_02), i.e., the result of TEMP_01 after having been left-hand bit-shifted TEMP_02 number of times. From block 660, flow proceeds to block 662, where the variable HASH is set equal to OR(HASH, TEMP_03), i.e., the result of a logical-OR combination of HASH and TEMP_03. From block 662, flow proceeds to a block 664, where the counter j is incremented, i.e., j=j+1. From block 664, flow loops back to decision block 650. In other words, once the loop has been iterated j=MAX times, then the variable HASH will hold the final output of hash function 432.

Figure 7:
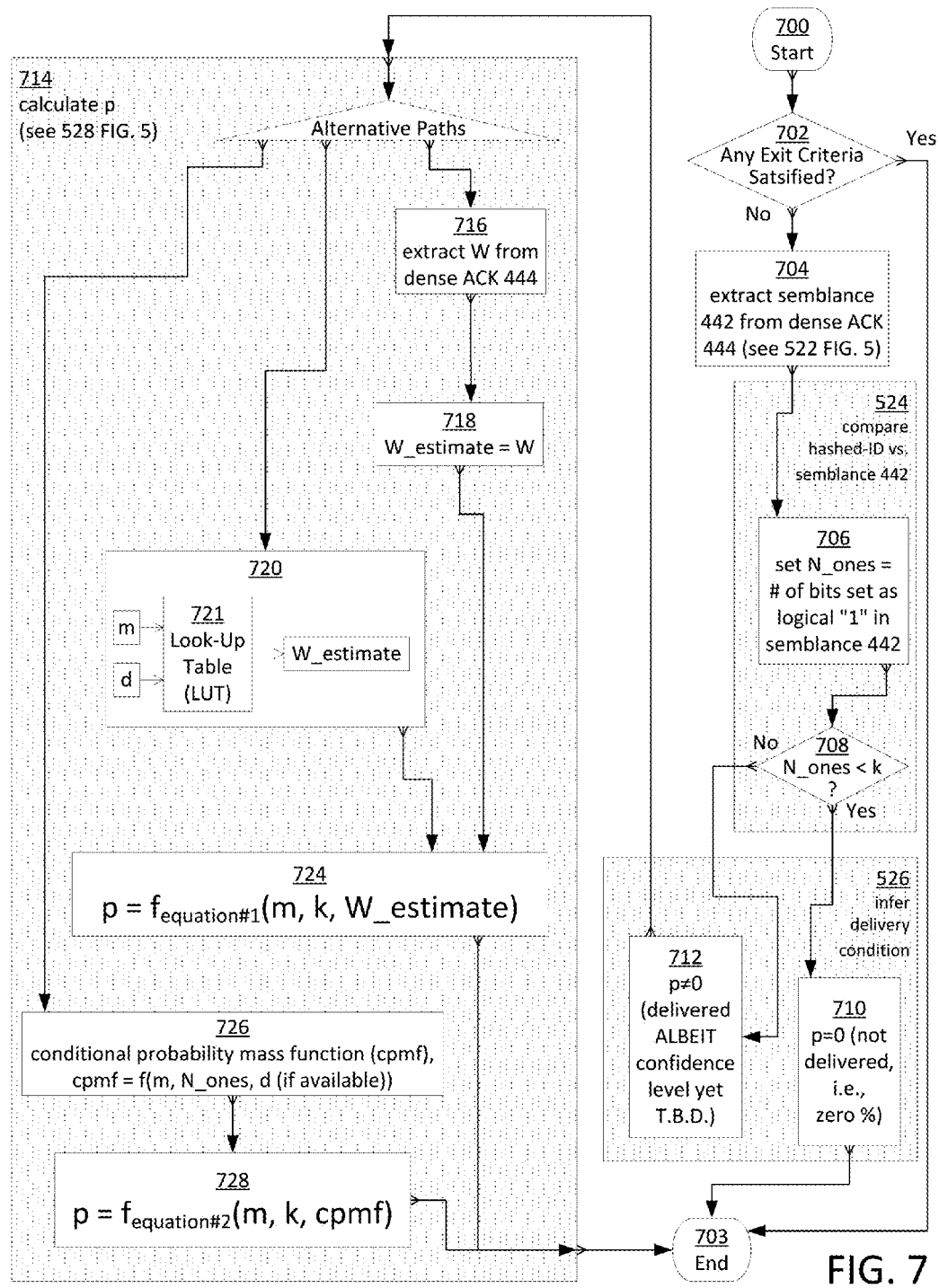
FIG. 7 is a flowchart illustrating the determination of a level of confidence that the inferred delivery-condition is accurate, according to an embodiment of the present invention

FIG. 7 is a flowchart illustrating the determination of a level of confidence that the inferred delivery-condition is accurate, according to an embodiment of the present invention.

For the discussion of FIG. 7, it can be helpful to recall: an extraction of semblance 442 from dense-ACK 444 is made via payload extractor 130 (e.g., see action 522 of FIG. 5); a comparison of semblance 442 and the hashed-ID of end node 502 is made via and a delivery-condition is inferred by delivery-condition inference engine 132 (e.g., see actions 524-526 of FIG. 5); and a determination of a confidence level (e.g., a percentage or probability, p) in the accuracy of the inferred (positive) delivery-condition is made via confidence calculator 134 (e.g., see action 530 FIG. 5). Actions 524-528 are discussed in more detail below in the context of the flowchart of FIG. 7.

In FIG. 7, as a general design consideration, no loop should be infinite, i.e., inescapable. Accordingly, flow in FIG. 7 starts at block 700 and proceeds to decision block 702, where inference engine 132 decides if any exit criteria have been satisfied. If the decision is yes (one or more of the exit criteria are satisfied), then flow proceeds to block 703 and ends. If the decision is no (none of the exit criteria has been satisfied), then flow proceeds to block 704.

At block 704, semblance 442 is extracted from dense-ACK 444 (e.g., see action 522 of FIG. 5). From block 704, flow proceeds to block 706, where inference engine 132 determines the number bits in semblance 442 whose value is set to logical ONE and then sets a variable, N_ones, equal to that number, i.e., N_ones=the number of logical ones in semblance 442. From block 706, flow proceeds to decision block 708, where inference engine 132 determines if N_ones is less than k, where (as noted above) k is the maximum number of bit positions in semblance 442 that can be set to a logical ONE value. It is noted that blocks 706-708 can be included in action 524 of FIG. 5. From decision block 708, flow proceeds to either block 710 or block 712.

If the outcome of decision block 708 is yes (N_ones IS less than k), then flow proceeds to block 710, where inference engine 132 infers a negative delivery condition, i.e., infers (with 100% certainty) that the corresponding message was NOT successfully delivered to (received by) central node 106, and sets p=0 (zero percent probability). From block 710, flow proceeds to block 703 and ends.

If the outcome of decision block 708 is no (N_ones is NOT less than k), then flow proceeds to block 712, where inference engine 132 infers a positive delivery condition, i.e., infers that the corresponding message WAS successfully delivered such that p≠0 albeit without determining a level of confidence in the accuracy of the positive delivery-condition inference. As of block 712, the confidence-level of the positive delivery-condition is yet to be determined ("T.B.D."). The confidence-level determination is discussed below in the context of block 714. It is noted blocks 710-712 can be included in action 526 of FIG. 5. From block 712, flow proceeds to block 714.

At block 714, confidence calculator 134 calculates the confidence level, p, that the inferred positive delivery-condition is accurate. There are various ways in which the confidence-level can be determined, a few examples of which are illustrated in block 714 of FIG. 7. In other words, multiple alternate flow paths are illustrated in block 714, each of which produces will result in the calculation of a confidence-level.

Flow can enter block 714 and proceed to block 716, where payload extractor 130 can also extract W from the payload of dense-ACK 444 (e.g., see action 522 of FIG. 5), where extracting W is another example of manipulating payload 446 of dense ACK 444, i.e., another example of manipulating semblance 442. It is to be recalled that W is the number of the N independent transmissions from the N instances of end node 102 that are received by central node 106. From block 716, flow proceeds to block 718, where confidence calculator 134 sets a variable, W_estimate, equal to W, i.e., W_estimate=W. From block 718, flow proceeds to block 724 (discussed below).

Alternatively, flow can enter block 714 and proceed to block 720, where confidence calculator 134 inputs (or indexes) the values of the variables m and d into a look-up table ("LUT") 721 (e.g., stored in one or more of the memories in an instance of end node 102 (noted above)) to obtain therefrom a value of W_estimate. In general, an LUT is an array of memory locations which can be used to replace a runtime computation with a simpler array-indexing operation. Various combinations of input values for a given equation and the corresponding resultant output values of the given equation are stored in the LUT. In circumstances in which retrieving a value from memory is faster and/or consumes less 'resources' (e.g., energy stored in a battery) than undergoing a discrete computation, it can be beneficial to use an LUT. Such a benefit is assumed in FIG. 7, hence LUT 721 is illustrated.

In block 720, it is to be recalled: m is the bit-length of the hashed-IDs as well as the bit-length of semblance 442. The variable d is additional data that can be included in the payload of dense-ACK 444 and additionally extracted by payload extractor 130, where extracting d is another example of manipulating payload 446 of dense ACK 444, i.e., another example of manipulating semblance 442. For example, d can be a variable in an equation 'known' to the instances of end node 102 (via the configuration of LUT 721). As a more particular example, d could be a variable in the equation W=g*m+d (represented by the configuration of LUT 721), where a value of d can be a non-negative integer, e.g., in the range 0-9, and where g can be a constant, e.g., g=10. In this particular example, instances of end node 102 already know the value of m, so with the additional value of d, the exact value of W can be extracted LUT 721. calculated. From block 718, flow proceeds to block 724 (discussed below).

From either of blocks 718 and 720, flow can proceed to block 724, where confidence calculator 134 calculates p (where, again, p is the confidence level that the inferred positive delivery-condition is accurate) as a function of m, k and W_estimate using the following equation:

$$p = 1 - \left\{1 - \left(1 - \frac{1}{m}\right)^{k \cdot W\_estimate}\right\}^k, \quad (1)$$

where W_estimate is is the estimated number of the N independent transmissions from the N instances of end node 102 that are received by central node 106, k (as noted above) is the maximum number of bit positions in semblance 442 that can be set to a logical ONE value, and m is the bit-length of the hashed-IDs as well as the semblance 442 thereof. From block 724, flow exits block 714, proceeding to block 703, where flow ends.

Alternatively, flow can enter block 714 and proceed to block 726, where confidence calculator 134 calculates the conditional probability mass function ("cpmf") of W based on m, N_ones and (if available) d, namely $P_w$(w|m, d, N_ones), where W (uppercase) is treated as being a random variable and w (lower case) is a particular value taken on by the random variable W in the calculation), and the notation "w|m" denotes that the probability mass function ("pmf") of W is actually a conditional pmf (cpmf). From block 726, flow proceeds to block 728.

At block 728, confidence calculator 134 calculates p (where, again, p is the confidence level that the inferred positive delivery-condition is accurate) as a function of m, k and cpmf using the following equation:

$$p = \Sigma_w \left\{P_W(w \mid m, d, \text{N\_ones}) \cdot \left(1 - \left\{1 - \left(1 - \frac{1}{m}\right)^{k \cdot w}\right\}^k\right)\right\}, \quad (2)$$

where $P_w$ denotes the conditional probability mass function (cpmf) of W (wherein W (uppercase) is treated as being a random variable and w (lower case) is a discrete value taken on by the random variable W in the calculation), the notation "w|m" denotes that the probability mass function ("pmf") of W is actually a conditional pmf (cpmf), k (as noted above) is the maximum number of bit positions in semblance 442 that can be set to a logical ONE value, m is the bit-length of the hashed-IDs as well as the semblance 442 thereof, and N_ones is the number of logical ones in semblance 442. From block 728, flow exits block 714, proceeding to block 703, where flow ends.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of the embodiments explicitly discussed herein, those skilled in the art will appreciate that the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of acknowledging received messages, the method comprising:
   receiving, at a central node, multiple data messages from multiple instances of a message-sourceable end node, respectively, each of the end-node-instances having a unique identification ("ID"); and
   sending, from the central node to the end-node-instances, a dense acknowledgement message ("dense ACK") representing a payload portion of a data message of an instance of the end nodes and acknowledging receipt of the data messages, in which the dense ACK comprises a selected sampling from among the respective payload portions after each of the respective payload portions has been converted to not explicitly identify any of the IDs of the corresponding end-node-instances.

2. The method of claim 1, wherein:
the method is iterative according to a listening interval;
a given instance of the receiving occurs during an $r^{th}$ listening interval, where r is a non-negative integer; and
a corresponding given instance of the sending of the dense ACK occurs during an $(r+v)^{th}$ listening interval, where v is a positive integer.

3. The method of claim 2, wherein for the dense ACK sent during the $(r+1)^{th}$ listening interval, the method further comprises:
generating the dense ACK during the $(r+v)^{th}$ listening interval.

4. The method of claim 1, wherein:
the dense ACK includes a combination of hashed versions of unhashed IDs of the end-node-instances from which messages were received, respectively.

5. The method of claim 1, further comprising generating the dense ACK, the generating including:
lossy-compressing unhashed IDs of the end-node-instances, respectively.

6. The method of claim 5, wherein the lossy-compressing includes:
applying a hashing function to the unhashed IDs of the end-node-instances to form hashed-IDs, respectively; and
logically combining the hashed-IDs to form a semblance of the unhashed IDs.

7. The method of claim 6, wherein:
bit-lengths of the hashed-IDs and the semblance are the same; and
the combining includes:
logically OR-ing together the hashed-IDs to produce the semblance.

8. The method of claim 1, wherein:
the receiving and the sending are performed wirelessly.

9. In a network including a central node and multiple, message-sourceable end nodes, a method of operating a given instance of the end nodes to infer a delivery-condition at the central node of a data message sent by the given end-node-instance, the method comprising:
sending, from the given end-node-instance to the central node, a given data message including a unique identification ("ID") of the end-node-instance;
receiving, at the given end-node-instance from the central node, a dense acknowledgement message ("dense ACK") including a payload indicating receipt of the given data message, among multiple data messages, but not explicitly identifying an ID of the given end-node-instance nor IDs of other end-node-instances corresponding to the received messages, respectively;
manipulating the payload of the dense ACK; and
inferring a delivery-condition at the central node of the given data message based on the manipulated payload,
wherein the dense ACK comprises a selected sampling, from among the unique ID and at least one other unique ID corresponding to at least one of the multiple data messages received at the central node, after each of the unique IDs has been converted at the central node to not explicitly identify an ID of the given end-node-instance nor IDs of the other end-node-instances corresponding to the received messages, respectively.

10. The method of claim 9, wherein:
the payload of the dense ACK is a result of lossy-compression.

11. The method of claim 9, wherein
the dense ACK includes a semblance of unhashed IDs of end-node-instances, one of which may be the given end-node-instance; and
the manipulating includes:
extracting the semblance from the payload; and
bit-wise comparing the semblance against the unhashed ID of the given end-node-instance.

12. The method of claim 11, wherein:
the bit-wise comparing includes:
identifying any instance of there being a logical-one-mismatch, the logical-one-mismatch denoting a situation in which, for a given bit position, there is a logical-one in the hashed ID and a logical-zero in the semblance; and
the inferring a delivery-condition includes:
concluding a negative delivery-condition that the message was not received based on the logical-one-mismatch.

13. The method of claim 11, wherein:
the bit-wise comparing includes:
identifying any instance of there being a logical-one-mismatch, the logical-one-mismatch denoting a situation in which, for a given bit position, there is a logical-one in the hashed ID and a logical-zero in the semblance; and
the inferring a delivery-condition includes:
concluding, if there are no bitwise logical-one mismatches, a positive delivery-condition that the message was received; and
the method further comprises:
determining a confidence-level of the inferred positive delivery-condition.

14. The method of claim 13, wherein the determining a confidence-level of the inferred positive delivery-condition is based on at least one of the following equations:

$$p = 1 - \left\{ 1 - \left(1 - \frac{1}{m}\right)^{k \cdot \wedge W\_estimate} \right\}^k, \quad (1)$$

where W_estimate is an estimate of a random variable W representing a number of independent transmissions from instances of the end node that are received by the central node, k is a positive integer representing a maximum number of bit positions in the semblance that can be set to a logical ONE value, and m is a bit-length of the hashed-ID; and $$p = \Sigma_w \left\{ P_W(w \mid m, d, N\_ones) \cdot \left(1 - \left\{ 1 - \left(1 - \frac{1}{m}\right)^{k \cdot w} \right\}^k \right) \right\}, \quad (2)$$

where $P_w$ denotes a conditional probability mass function of W, w is a discrete value of W, k is a positive integer representing a maximum number of bit positions in the semblance that can be set to a logical ONE value, and m is a variable representing a bit-length of the hashed-ID.

15. The method of claim 14, wherein:
the determining a confidence-level of the inferred positive delivery-condition is based on Equation (1);
the manipulating further includes:
extracting W from the payload, where W is a positive integer representing W a number of independent transmissions from N instances of the end node that are received by the central node; and the determining a confidence-level includes setting W_estimate equal to W.

16. The method of claim 14, wherein:
the determining a confidence-level of the inferred positive delivery-condition is based on Equation (1);
the manipulating further includes:
extracting a value of a variable, d, from the payload; and
the determining a confidence-level includes:
obtaining a value of W_estimate from a predefined relationship between values of the variables m and k.

17. The method of claim 13, further comprising:
comparing the confidence-level against a threshold; and
resending the given message based on the results of the comparison.

18. The method of claim 9, wherein:
the sending and the receiving are performed wirelessly.

19. An apparatus for acknowledging received messages, the apparatus comprising:
an interface configured to receive multiple data messages from multiple instances of message-sourceable end nodes, respectively, each end-node-instance having a unique identification ("ID"); and
an processor configured to generate a dense acknowledgement message ("dense ACK") representing a payload of a data message of an instance of the end nodes and acknowledging receipt of the data messages, in which the dense ACK comprises a selected sampling from among the respective unique IDs after each of the respective unique IDs has been converted to not explicitly identify any of the IDs of the corresponding end-node-instances;
wherein the wireless interface is configured to send, to the end-node-instances, the dense ACK.

20. The apparatus of claim 19, wherein the processor is further configured to:
generate a lossy combination of hashed versions of unhashed IDs of the end-node-instances from which messages were received, respectively.

21. The apparatus of claim 19, wherein:
the processor is further configured to generate the combination by:
applying a hashing function to the unhashed IDs of the end-node-instances to form hashed-IDs, respectively; and
logically combining the hashed-IDs to form a semblance of the unhashed IDs; and
the dense ACK includes the semblance.

22. In a network including a central node and instances of a message-sourceable end node apparatus, a given instance of the end node apparatus being configured to infer a delivery-condition at the central node of a data message sent by the given instance, the given instance of the end node apparatus comprising:
an interface configured to:
send, to the central node, a given data message including a unique identification ("ID") of the end-node-instance; and
receive, from the central node, a dense acknowledgement message ("dense ACK") including a payload indicating receipt of the given data message, among multiple data messages, but not explicitly identifying an ID of the given end-node-instance nor IDs of other end-node-instances corresponding to the received messages, respectively; and
a processor configured to:
manipulate the payload of the dense ACK; and
infer a delivery-condition at the central node of the given data message based on the manipulated payload,
wherein the dense ACK comprises a selected sampling, from among the unique ID and at least one other unique ID corresponding to at least one of the multiple data messages received at the central node, after each of the unique IDs has been converted at the central node to not explicitly identify an ID of the given end-node-instance nor IDs of the other end-node-instances corresponding to the received messages, respectively.

23. The given instance of the end node apparatus of claim 22, wherein:
the dense ACK includes a semblance of unhashed IDs of end-node-instances, one of which may be the given instance; and
the processor is further configured to:
extract the semblance from the payload; and
bit-wise comparing the semblance against the unhashed ID of the given instance.

24. The given instance of the end node apparatus of claim 23, wherein:
the bit-wise comparison by the processor includes the processor being further configured to:
identify any instance of there being a logical-one-mismatch, the logical-one-mismatch denoting a situation in which, for a given bit position, there is a logical-one in the hashed ID and a logical-zero in the semblance; and
the inference by the processor includes the processor being further configured to: conclude a negative delivery-condition that the message was not received based on the logical-one-mismatch.

25. The given instance of the end node apparatus of claim 23, wherein:
the bit-wise comparison by the processor includes the processor being further configured to:
identify any instance of there being a logical-one-mismatch, the logical-one-mismatch denoting a situation in which, for a given bit position, there is a logical-one in the hashed ID and a logical-zero in the semblance; and
the inference by the processor includes the processor being further configured to:
conclude, if there are no bitwise logical-one mismatches, a positive delivery-condition that the message was received; and
the processor being further configured to:
determine a confidence-level of the inferred positive delivery-condition.

26. The given instance of the end node apparatus of claim 25, wherein the processor is further configured to:
compare the confidence-level against a threshold; and
resend, via the interface, the given message based on the results of the comparison.

* * * * *